(12) United States Patent
Achard et al.

(10) Patent No.: US 12,312,057 B2
(45) Date of Patent: May 27, 2025

(54) INTEGRATED ELECTRIC OUTBOARD MOTOR ASSEMBLY

(71) Applicant: Taiga Motors Inc., Lasalle (CA)

(72) Inventors: Paul Achard, Montreal (CA); Samuel Bruneau, Montreal (CA)

(73) Assignee: Taiga Motors Inc., Lasalle (CA)

( * ) Notice: Subject to any disclaimer, the term of this patent is extended or adjusted under 35 U.S.C. 154(b) by 666 days.

(21) Appl. No.: 17/569,823

(22) Filed: Jan. 6, 2022

(65) Prior Publication Data

US 2022/0219798 A1 Jul. 14, 2022

Related U.S. Application Data

(60) Provisional application No. 63/135,491, filed on Jan. 8, 2021.

(51) Int. Cl.

| | |
|---|---|
| *B63H 20/02* | (2006.01) |
| *B60L 50/60* | (2019.01) |
| *B60L 53/22* | (2019.01) |
| *B60L 58/26* | (2019.01) |
| *B63H 20/28* | (2006.01) |
| *B63H 23/04* | (2006.01) |
| *B63H 23/06* | (2006.01) |

(52) U.S. Cl.
CPC .............. *B63H 20/02* (2013.01); *B60L 50/66* (2019.02); *B60L 53/22* (2019.02); *B60L 58/26* (2019.02); *B63H 20/28* (2013.01); *B63H 23/04* (2013.01); *B63H 23/06* (2013.01); *B60L 2210/40* (2013.01)

(58) Field of Classification Search
CPC ...... B63H 20/00; B63H 20/007; B63H 20/02; B63H 20/28; B63H 21/00; B63H 21/07; B63H 23/00; B63H 23/04; B63H 23/06; B63H 2023/0216; B63H 23/24; B60L 50/66; B60L 53/22; B60L 58/26; B60L 2210/40; H01M 10/625; H01M 10/613; H01M 50/249; H01M 2220/20
USPC ....... 440/1, 6, 49, 53, 75, 76, 84, 86, 87, 88
See application file for complete search history.

(56) References Cited

U.S. PATENT DOCUMENTS

| | | | |
|---|---|---|---|
| 3,714,919 A | 2/1973 | Ernst | |
| 10,435,127 B2 | 10/2019 | Suzuki et al. | |
| 11,485,192 B2 * | 11/2022 | Bruneau | ........... H01M 10/6557 |
| 11,764,423 B2 * | 9/2023 | Bruneau | ............. H01M 50/249 |
| | | | 429/120 |
| 11,817,766 B2 * | 11/2023 | Bruneau | ................. H02K 9/00 |

(Continued)

FOREIGN PATENT DOCUMENTS

| | | |
|---|---|---|
| JP | 2006036026 | 2/2006 |
| JP | 2010228560 | 10/2020 |

OTHER PUBLICATIONS

Safety Standards for Backyard Boat Builders (published 1993).

(Continued)

*Primary Examiner* — Daniel V Venne
(74) *Attorney, Agent, or Firm* — Dicke, Billig & Czaja, PLLC

(57) ABSTRACT

An electric outboard motor assembly is disclosed. In one example, the electric outboard motor assembly includes a battery pack located in an upper unit and a propeller assembly located in a lower unit. A motor assembly is located in a middle unit between the upper unit and the lower unit. The electric outboard motor assembly may also include a thermal management system.

24 Claims, 16 Drawing Sheets

(56) References Cited

U.S. PATENT DOCUMENTS

2006/0040573 A1* 2/2006 Kobayashi ........... B63H 20/007
429/513
2020/0067041 A1* 2/2020 Wurden ............. H01M 50/383

OTHER PUBLICATIONS

Boating Performance (accessed Nov. 11, 2018).
https://www.torqeedo.com/us/en-us/products/outboards/deep-blue/deep-blue-50-r/M-3201-00.html (published Jun. 16, 2018).
https://boattest.com/engine-review/Evinrude/24000096_E-TEC-G2-250-HP_2014 (published 2014).
https://www.motorbiscuit.com/the-yamaha-f150-is-most-popular-outboard-motor-for-a-reason/ (published Aug. 27, 2020).
https://www.yachtingnews.com/mercury-v8-v6-test/ (published Jun. 8, 2018).
https://www.boatingmag.com/story/boats/oxe-diesel-outboards/ (published Oct. 27, 2020).
https://panorama4piano.com/seven-627sv-the-most-powerful-outboard-produced-in-the-world/ (published Feb. 22, 2020).
https://www.torqeedo.com/us/en-us/products/outboards/travel (published May 7, 2015).
http://www.boatmaginternational.com/3717-mercury-racing-new-ros-engine-for-xcat-world-series/ (published Dec. 9, 2015).

\* cited by examiner ial Patent Application No. 63/135,491, filed Jan. 8, 2021, which is incorporated by reference in its entirety herein.

INTEGRATED ELECTRIC OUTBOARD MOTOR ASSEMBLY

CROSS-REFERENCE TO RELATED APPLICATIONS

This application claims priority from U.S. Provisional Patent Application No. 63/135,491, filed Jan. 8, 2021, which is incorporated by reference in its entirety herein.

TECHNICAL FIELD

The present disclosure relates to electric vehicles and, in particular embodiments, to electric outboard motors.

BACKGROUND

Known electric boat motors range from small trolling motors to larger outboard motors. Trolling motors are designed to be portable, light weight, low power units. They are typically powered by small cylindrical batteries located in their upper unit that power a small motor in the lower unit that directly drives a propeller. These electric trolling motors typically provide a power range in the order of 0.5-3 HP.

Larger electric outboard motors that provide a greater power range are typically broken up into two components, with the electric motor located outboard of the boat and the battery pack located inboard on the boat itself. The large electric motor is typically housed in the upper unit of the outboard device with a shaft coupled to the propeller located in the lower unit. Alternatively, a motor in the lower unit may be coupled to an inverter and other power electronics located in the upper unit. With either design the battery pack is located on the boat itself, typically hidden within the hull of the boat. Often times, this requires a specially designed boat hull to accommodate the large battery pack.

SUMMARY

Some embodiments of the present disclosure provide an outboard motor having a battery pack, motor assembly and propeller assembly that are conveniently provided as a single integrated assembly for connection to a boat. This integrated outboard motor assembly may eliminate the need to store a battery pack within the hull of a boat, thereby making the outboard motor assembly more versatile for use with a variety of different boat designs. Further, the assembly provides an architecture that accommodates relatively high-power motors and/or relatively high energy density battery packs.

One example provides an electric outboard motor assembly having a battery pack located in an upper unit, a propeller assembly located in a lower unit and a motor assembly located in a middle unit between the upper unit and the lower unit.

In one example, an outboard motor housing includes a first portion that houses the battery pack and a second portion that houses the motor assembly. In one example, the first portion of the housing defines a first interior volume and the second portion of the housing defines a second interior volume, the first interior volume being greater than the second interior volume. In one example, the outboard motor assembly defines a longitudinal axis extending from the upper unit to the lower unit, wherein a first circumferential measurement of the first portion of the housing at a mid-point of the upper unit along the longitudinal axis is greater than a second circumferential measurement of the second portion of the housing at a mid-point of the middle unit along the longitudinal axis.

In one example, the outboard motor housing includes an inboard end operative for facing inboard of the watercraft and an outboard end operative for facing outboard of the watercraft, the inboard end of the second portion of the housing being indented in relation to the inboard end of the first portion of the housing. In one example, a transom mount is attachable to one of the second portion of the housing and an internal support structure of the outboard motor at a location beneath the upper unit.

In one example, the first portion of the housing and the second portion of the housing are at least partially integrally formed together. In one example, at least part of the first portion of the housing enables access to the battery pack. In one example, at least part of the second portion of the housing enables access to the motor assembly. In one example, a seam separates the first portion of the housing from the second portion of the housing. In one example, the first portion of the housing and the second portion of the housing are joined together at the seam.

In one example, battery pack includes a plurality of battery modules, which may be prismatic battery modules. In one example, each battery module includes a plurality of battery cells, which may be pouch battery cells.

In one example, each battery module includes at least one battery cell. In one example, the battery pack includes a first stack of prismatic battery modules and a second stack of prismatic battery modules, where the first stack is positioned over the second stack. In one example, the first stack of prismatic battery modules are oriented in a first orientation and the second stack of prismatic battery modules are oriented in a second orientation different than the first orientation. In one example, the first orientation is at 90 degrees with respect to the second orientation.

In one example, the motor assembly is an integrated motor assembly with an inverter and an alternating current (AC) motor contained within a common motor assembly housing. In one example, the propeller assembly includes a propeller drive shaft, and where a motor drive shaft of the motor assembly is perpendicular to the propeller drive shaft. In one example, a gear assembly is coupled between the motor assembly and the propeller assembly.

In one example, a thermal management system is in fluid communication with the battery pack and the outboard motor assembly. In one example, the thermal management system comprises a closed-loop liquid cooling system.

In one example, the electric outboard motor assembly has a center of gravity located between the battery pack and the motor assembly.

Another example provides an electric outboard motor assembly including an outboard motor housing, a battery pack including a plurality of battery modules, the battery pack located within the outboard motor housing, and a motor assembly located within the outboard motor housing. The battery modules may include a plurality of battery cells, such as pouch cells, for example.

In one example, the outboard motor housing includes a first housing portion and a second housing portion, where the battery pack is positioned within the first housing portion.

In one example, the battery pack includes a first stack of battery modules and a second stack of battery modules, where the first stack is positioned over the second stack. In one example, the first stack of battery modules are oriented in a first orientation and the second stack of battery modules are oriented in a second orientation different than the first orientation.

Another example provides an electric outboard motor assembly including an outboard motor housing, a battery pack, a motor assembly having an inverter and outboard motor, and a thermal management system in fluid communication with the battery pack and the motor assembly, where at least two of the battery pack, the motor assembly and the thermal management system are located within the outboard motor housing.

In one example, the battery pack, motor assembly and thermal management system are all at least partially located within the outboard motor housing. In one example, the thermal management system comprises a closed-loop liquid system. In one example, the thermal management system includes a coolant pump and a reservoir tank, in fluid communication with the battery pack and the motor assembly. In one example, the reservoir tank is located adjacent the battery pack. In one example, the thermal management system further includes a heat exchanger. In one example, the heat exchanger includes a raw water inlet and outlet to aid in removing rejected heat from coolant moving therethrough.

Additional and/or alternative features and aspects of examples of the present technology will become apparent from the following description, the accompanying drawings and the appended claims.

DETAILED DESCRIPTION

In the following detailed description, reference is made to the accompanying drawings which form a part hereof, and in which are shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

Figure 1:
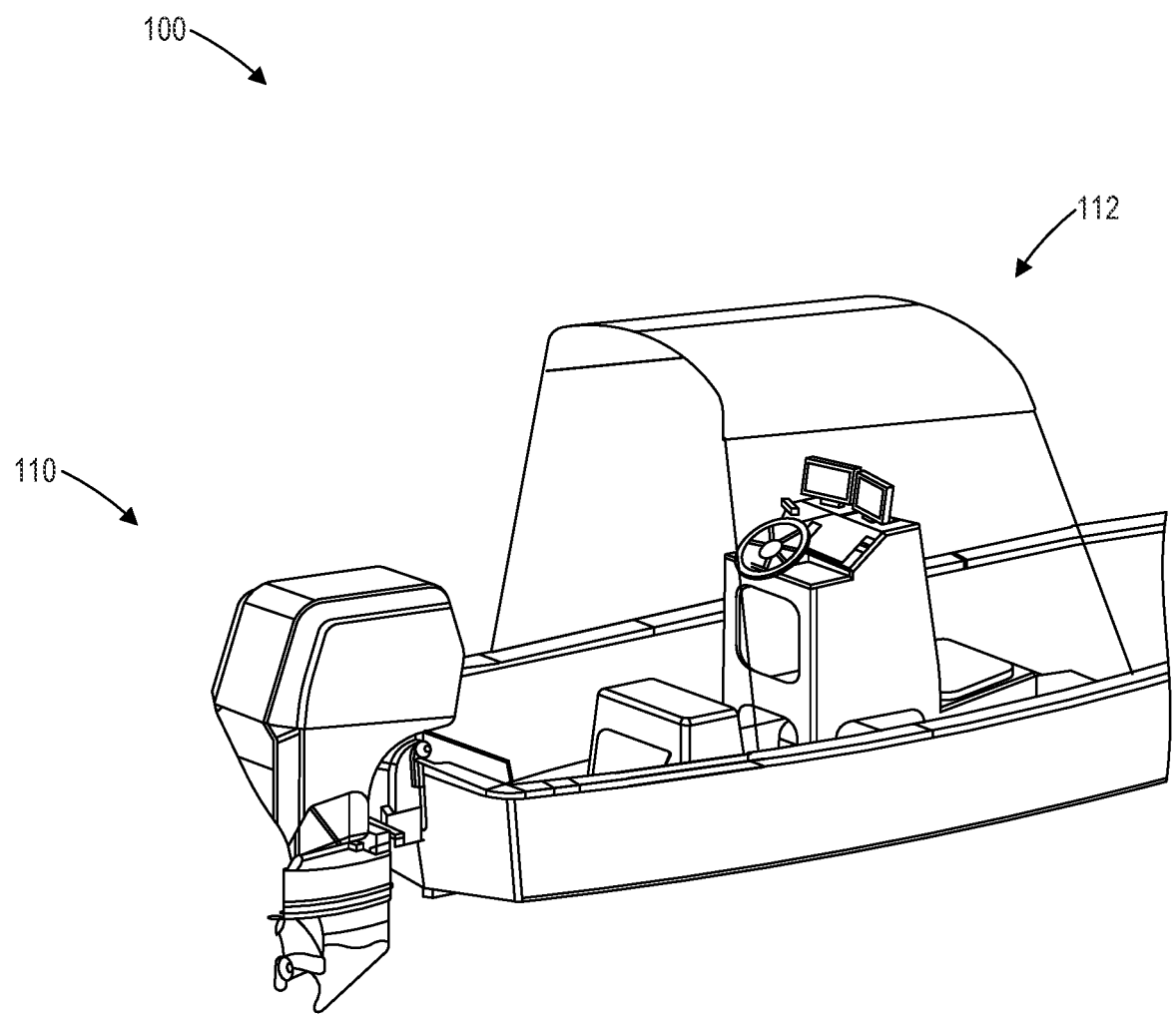
FIG. 1 is a perspective view of a boat assembly having an electric outboard motor assembly, according to one example of the present disclosure.

FIG. 1 is a perspective view illustrating one example of a boat assembly 100 having an electric outboard motor assembly 110 attached to a boat 112. The electric outboard motor assembly 110 is an example of an integrated electric outboard motor assembly that includes a battery pack and motor assembly located within the same housing. As will be described below, the battery pack and motor assembly provide high power and high energy density to the electric outboard motor assembly 110 such that it is able to provide a non-limiting power range of between at least 120-180HP. Since the battery pack and motor assembly are integrated into the same housing, the electric outboard motor assembly 110 can be used with differently sized boats and boat hulls. It is no longer necessary to locate a large battery pack in a specially designed boat hull in order to achieve high motor horsepower designs.

Figure 2:
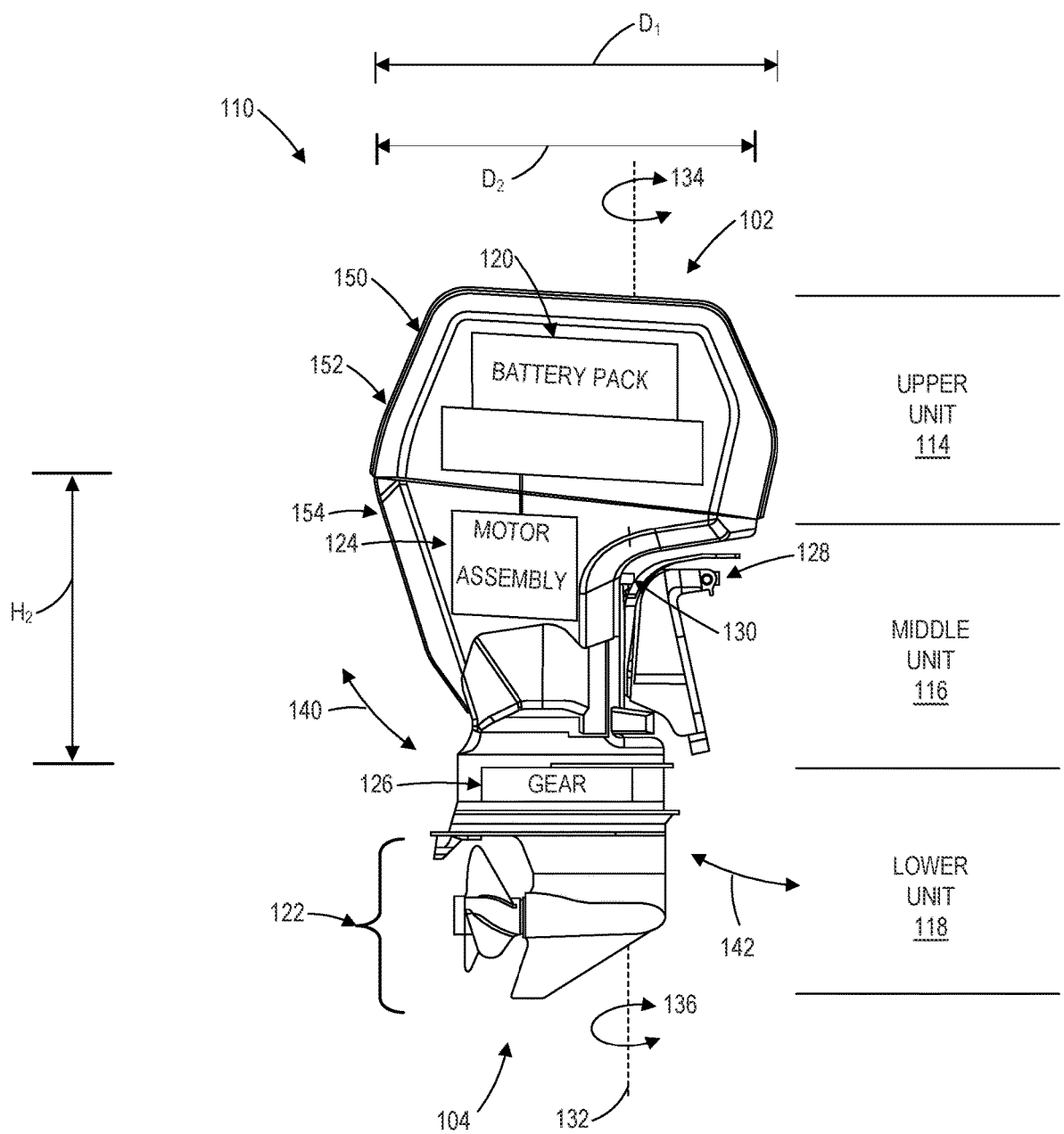
FIG. 2 is a side view of an electric outboard motor assembly showing a schematic arrangement of components, according to one example of the present disclosure.
Figure 3:
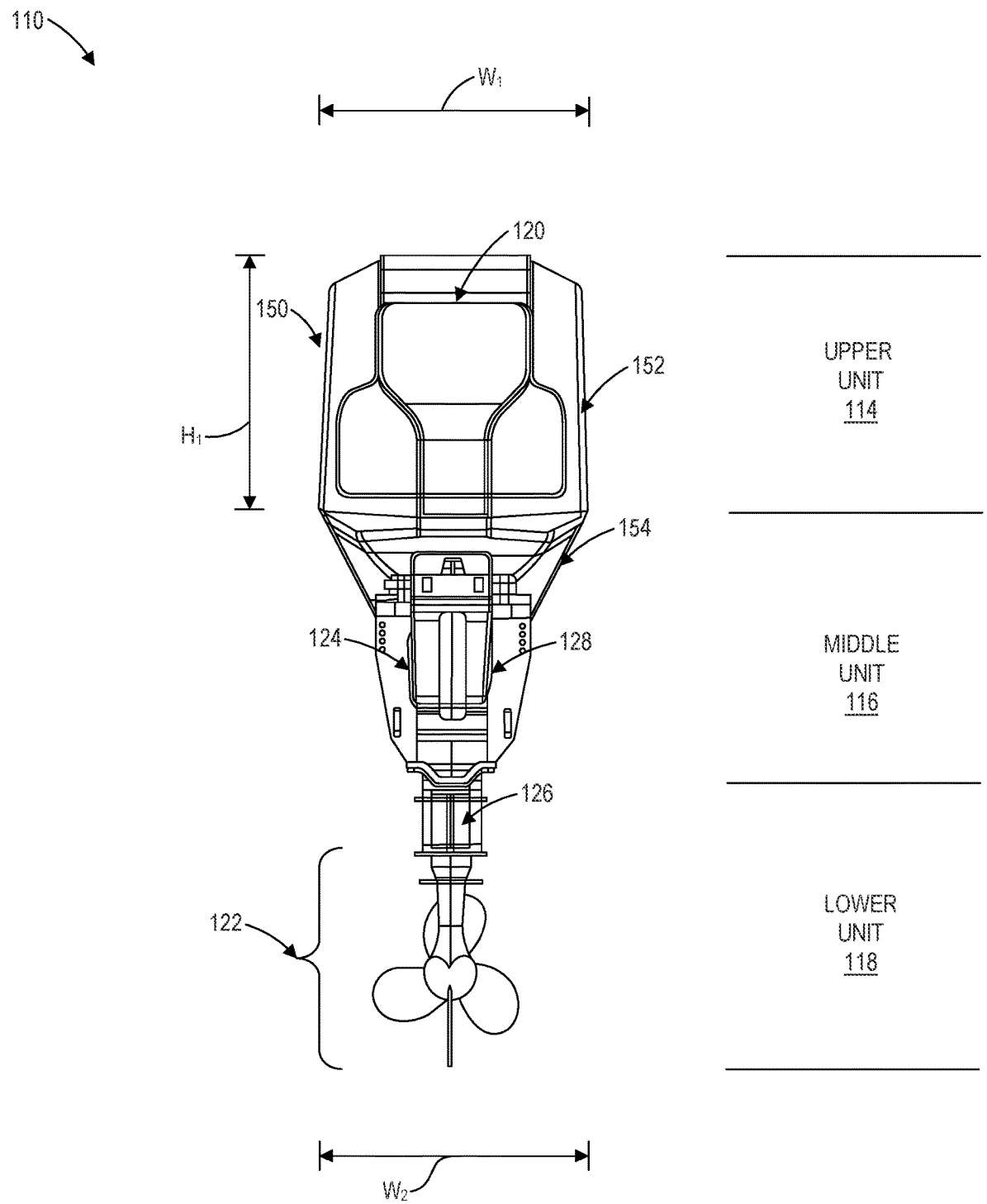
FIG. 3 is an end view of the electric outboard motor assembly of FIG. 2.

FIG. 2 is a side view of one example of an electric outboard motor assembly 110, showing a schematic positioning of the motor assembly components. FIG. 3 is an end view of the electric outboard motor assembly 110 of FIG. 2. The electric outboard motor assembly 110 includes an upper unit 114, a middle unit 116 and a lower unit 118. A battery pack 120 is located in the upper unit 114. A propeller assembly 122 is located in the lower unit 118. A motor assembly 124 is located in the middle unit 116 between the upper unit 114 and the lower unit 118.

The terms "upper", "lower" and "middle" used herein may refer to relative positions along a longitudinal axis of the electric outboard motor assembly 110 extending between an upper end 102 and a lower end 104 of the electric outboard motor assembly 110. The upper end 102 of the electric outboard motor assembly 110 may face vertically upwards when the electric outboard motor assembly 110 is positioned for use. The lower end 104 of the electric outboard motor assembly 110 may face vertically downwards when the electric outboard motor assembly 110 is positioned for use.

The upper unit 114, middle unit 116 and lower unit 118 may also be considered an upper portion, middle portion and lower portion, respectively. Each of the units 114, 116, 118 may define respective compartments or volumes to store components of the electric outboard motor assembly 110. In some examples, there is at least some separation between the compartments defined by the units 114, 116, 118 using, for example, walls or dividers. However, there need not always be separation between compartments defined by the units 114, 116, 118. Two or more of the units 114, 116, 118 may define compartments that are joined or otherwise integrated. In this way, the upper unit 114, middle unit 116 and lower unit 118 might not be individual physical elements of the electric outboard motor assembly 110, but may simply identify the relative positioning of the units in relation to each other. In some cases, the upper unit 114, middle unit 116 and lower unit 118 may be delineated by the location of the battery pack 120, motor assembly 124 and propeller assembly 122 along a longitudinal axis of the electric outboard motor assembly 110.

In some examples, the upper unit 114, the middle unit 116 and the lower unit 118 do not overlap along a longitudinal axis of the electric outboard motor assembly 110. For example, the battery pack 120 and the motor assembly 124 may be spaced apart along a longitudinal axis of the electric outboard motor assembly 110. Alternatively or additionally, the motor assembly 124 and the propeller assembly 122 may be spaced apart along a longitudinal axis of the electric outboard motor assembly 110. In other examples, the upper unit 114 may partially overlap with the middle unit 116 and/or the lower unit 118 may partially overlap with the middle unit 116. For example, the battery pack 120 and the motor assembly 124 may be partially coincident along a longitudinal axis of the electric outboard motor assembly 110, and/or the motor assembly 124 and the propeller assembly 122 may be partially coincident along a longitudinal axis of the electric outboard motor assembly 110.

In one example, a gear assembly 126 is positioned within the lower unit 118. In other examples, the gear assembly 126 can be located in the middle unit 116. Alternatively, the electric outboard motor assembly 110 may be a direct drive unit and may not include the gear assembly 126.

A transom mount 128 is configured to couple the electric outboard motor assembly 110 to the transom of a boat. The transom mount 128 may include fasteners (e.g., bolts and screws) and/or clamps to mount to the transom of the boat. The transom mount 128 is rotatably connected to the electric outboard motor assembly 110. The transom mount 128 connection mechanisms allow the transom mount 128 to be rotated horizontally side to side (e.g., for steering the boat). In one example, the transom mount 128 includes a pivot point 130. The electric outboard motor assembly 110 is movable or can be 'pivoted" side to side at the pivot point 130 (relative to the transom mount 128) about a pivot axis 132, as indicated by rotational arrows 134, 136. The pivot axis 132 may generally correspond to a longitudinal axis of the electric outboard motor assembly 110. Additionally, the electric outboard motor assembly 110 can be moved vertically up and down to "trim" the motor for boating between shallow water areas and deep water areas or during trailering of the boat. The trim can also be used to adjust the attitude of the boat in the water. In one example operation, the electric outboard motor assembly 110 can be rotated upward or downward, indicated by rotational arrows 140, 142 about a trim axis (not shown) running through pivot point 130. The transom mount 128 can be moved or rotated either manually or through a boat control system. In other embodiments, the electric outboard motor assembly 110 can be part of an inboard/outboard boating system and can be operated entirely by the boat control system.

In some examples, the electric outboard motor 110 may include a mount to couple to portions of a boat other than the transom, such as the bow, for example.

As shown in FIGS. 2-3, the electric outboard motor assembly 110 includes an outboard motor housing 150. According to an example of the present disclosure, both the battery pack 120 and the motor assembly 124 are housed within the outboard motor housing 150. The outboard motor housing 150 may be designed to have substantially similar dimensions as traditional combustion engine outboard motors. As shown, the outboard motor housing 150 extends at least partially over the battery pack 120 and the motor assembly 124. In one example, the outboard motor housing 150 extends entirely over the battery pack 120 and the motor assembly 124. The outboard motor housing 150 may be made of a rigid polymeric (i.e., plastic) material. In other examples, the outboard motor housing may be made of other materials, such as metal or a composite material.

Figure 4:
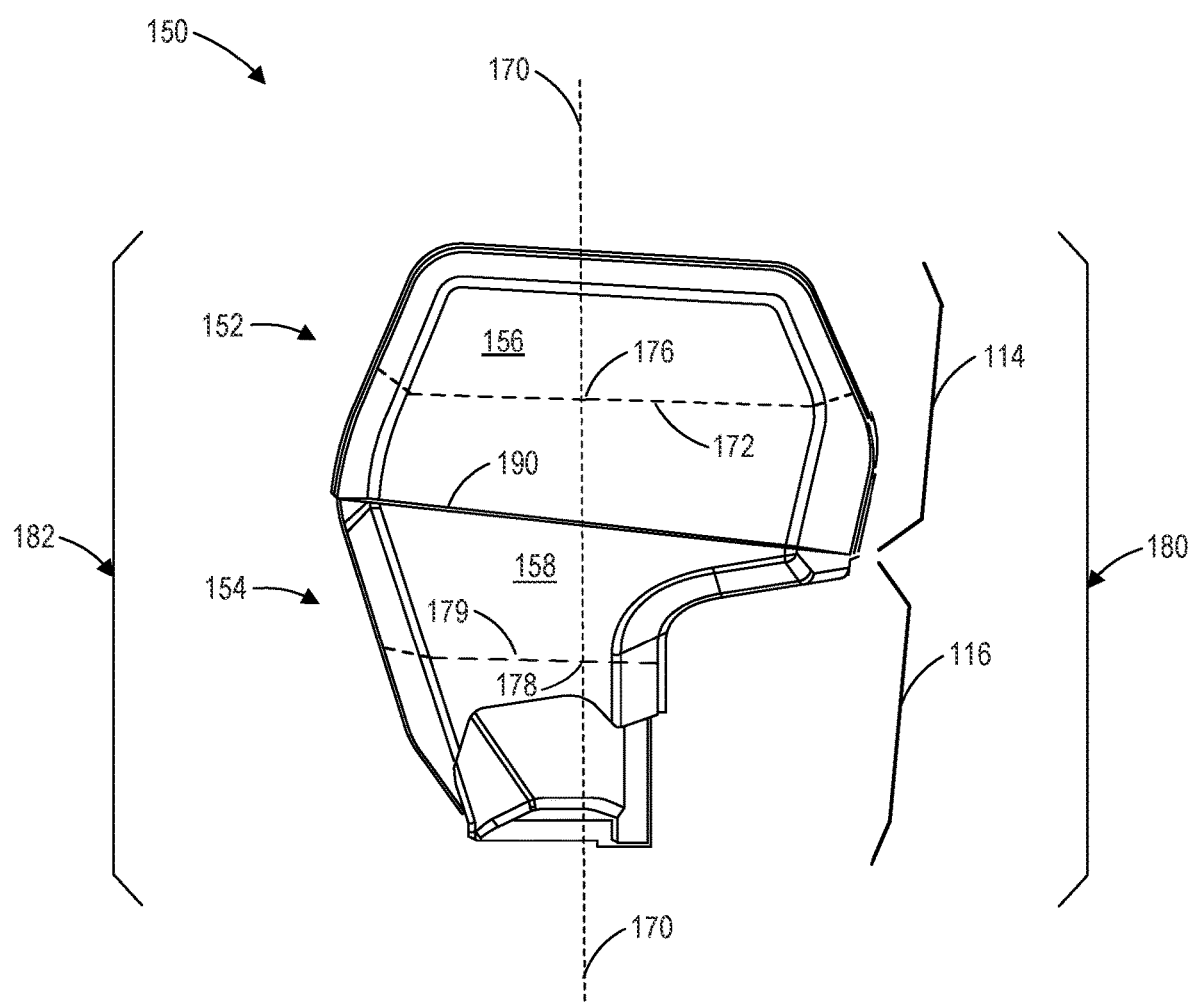
FIG. 4 is a side view of an outboard motor housing according to one example of the present disclosure.

Reference is also made to FIG. 4, which is a diagram further illustrating the outboard motor housing 150. In one example, the outboard motor housing 150 includes a first portion 152 associated with the upper unit 114 of the electric outboard motor assembly 110 and a second portion 154 associated with the middle unit 116 of the electric outboard motor assembly 110. The first portion 152 of the housing 150 houses the battery pack 120 and the second portion 154 houses the motor assembly 124. The first portion 152 defines a first interior volume 156 and the second portion 154 defines a second interior volume 158, the first interior volume 156 being greater than the second interior volume 158.

In accordance with a non-limiting example, in order to provide sufficient energy density to the electric outboard motor assembly 110, the battery pack 120 may take up a larger volumetric space than the motor assembly 124. Accordingly, the battery pack 120 may be housed within the first portion 152 of the housing 150 associated with the upper unit 114 that traditionally provides a larger volumetric space than the second portion 152 of the housing 150 associated with the middle unit 116. This configuration of housing the battery pack 120 above the motor assembly 124 allows the components of the electric outboard motor assembly 110 to fit within a housing having substantially similar dimensions as traditional combustion engine outboard motors. While the Figures illustrate an outboard motor housing 150 having a shape and configuration similar to those of traditional outboard motors, it is possible for the electric outboard motor assembly 110 to have a housing 150 having any shape and configuration suitable for housing the battery pack 120 and the motor assembly 124 in the manners described herein.

In accordance with a non-limiting example, the first portion 152 of the housing 150 may have a height $H_1$ between 35-65 cm, a width $W_1$ between 40-70 cm and a depth $D_1$ between 80-120 cm. The second portion 154 of the housing 150 may have a height $H_2$ between 60-100 cm, a width $W_2$ between 40-70 cm and a depth $D_2$ between 80-120 cm.

In other examples, the first interior volume 156 is substantially the same or less than the second interior volume 158. In this example, the electric outboard motor assembly 110 may be rated for operation at a lower horsepower and as such may require housing for fewer and/or smaller battery modules. In other examples, the first portion 152 of the housing 150 houses the motor assembly 124 and the second portion 154 of the housing 150 houses the battery pack 120. In this example, the second portion 154 may have a second interior volume 158 that is larger than the first interior volume 156 of the first portion 152.

With reference to FIG. 4, the outboard motor housing 150 includes an inboard end 180 operative for facing inboard of a watercraft and an outboard end 182 operative for facing outboard of a watercraft, the inboard end 180 of the second portion 154 of the housing 150 is indented in relation to the inboard end 180 of the first portion 152 of the housing 150. This indentation provides a space for receiving the transom mount 128 described above. In one example, the transom mount 128 is attachable to the inboard end 180 of the second portion 154 of the housing 150. In a further non-limiting example, the transom mount 128 is positioned beneath the upper unit 114 of the electric outboard motor assembly 110. The transom mount 128 may be attached to an internal support structure of the electric outboard motor assembly 110 that supports the motor assembly 124 and battery pack 120, among other components.

As described above, a shape of the second portion 154 of the housing 150 may comprise an indentation or recess to accommodate the attachment of the transom mount 128. Accordingly, a cross-sectional area or circumference of the second portion 154 of the housing 150 may be less than a cross-sectional area or circumference of the first portion 154 of the housing. More specifically, in a non-limiting example, the electric outboard motor assembly 110 defines a longitudinal axis 170 extending from the upper unit 114 to the lower unit 118. A first circumferential measurement 172 of the first portion 152 of the housing 150 at a mid-point 176 of the upper unit 114 along the longitudinal axis 170 is greater than a second circumferential measurement 179 of the second portion 154 of the housing 150 at a mid-point 178 of the middle unit 116 along the longitudinal axis 170.

In one example, at least part of the first portion 152 of the housing 150 and the second portion 154 of the housing 150 are integrally formed together. A seam 190 may define a transition between the first portion 152 of the housing 150 and the second portion 154 of the housing 150. In one example, seam 190 is defined as a bend or indent in the housing 150. The seam 190 may be a molded demarcation in an integrally formed housing 150, or the seam 190 may be a physical separation between the first portion 152 and second portion 154. In such an example, the first portion 152 and the second portion 154 may be separate pieces that are connected together to form housing 150, and may be physically joined together at the seam 190 via fasteners (e.g., nuts, bolts, screws and/or rivets), adhesives, welds and/or a snap-fit arrangement. In yet a further alternative, the seam 190 may be absent such that there is no physical or visual demarcation between the first portion 152 of the housing 150 and the second portion 154 of the housing. In such a case, the transition between the first portion 152 of the housing 150 and the second portion 154 of the housing may occur at any position along the longitudinal axis 170 between the battery pack 120 and the motor assembly 124.

In another example, at least part of the first portion 152 of the housing 150 is removable or openable for access to the battery pack 120. This removeable and/or openable access to the battery pack 120 may enable components of the battery pack 120, such as battery modules, to be replaced. In a further example, at least part of the second portion 154 of the housing 150 is removable or openable for access to the motor assembly 124. For example, the first portion 152 and/or the second portion 154 of the housing 150 may define a hatch or door for providing access to the battery pack 120 and/or motor assembly 124. In one example, the entire housing 150 is at least partially removable or openable as a single unit for access to the battery pack 120 and/or the motor assembly 124.

Figure 5:
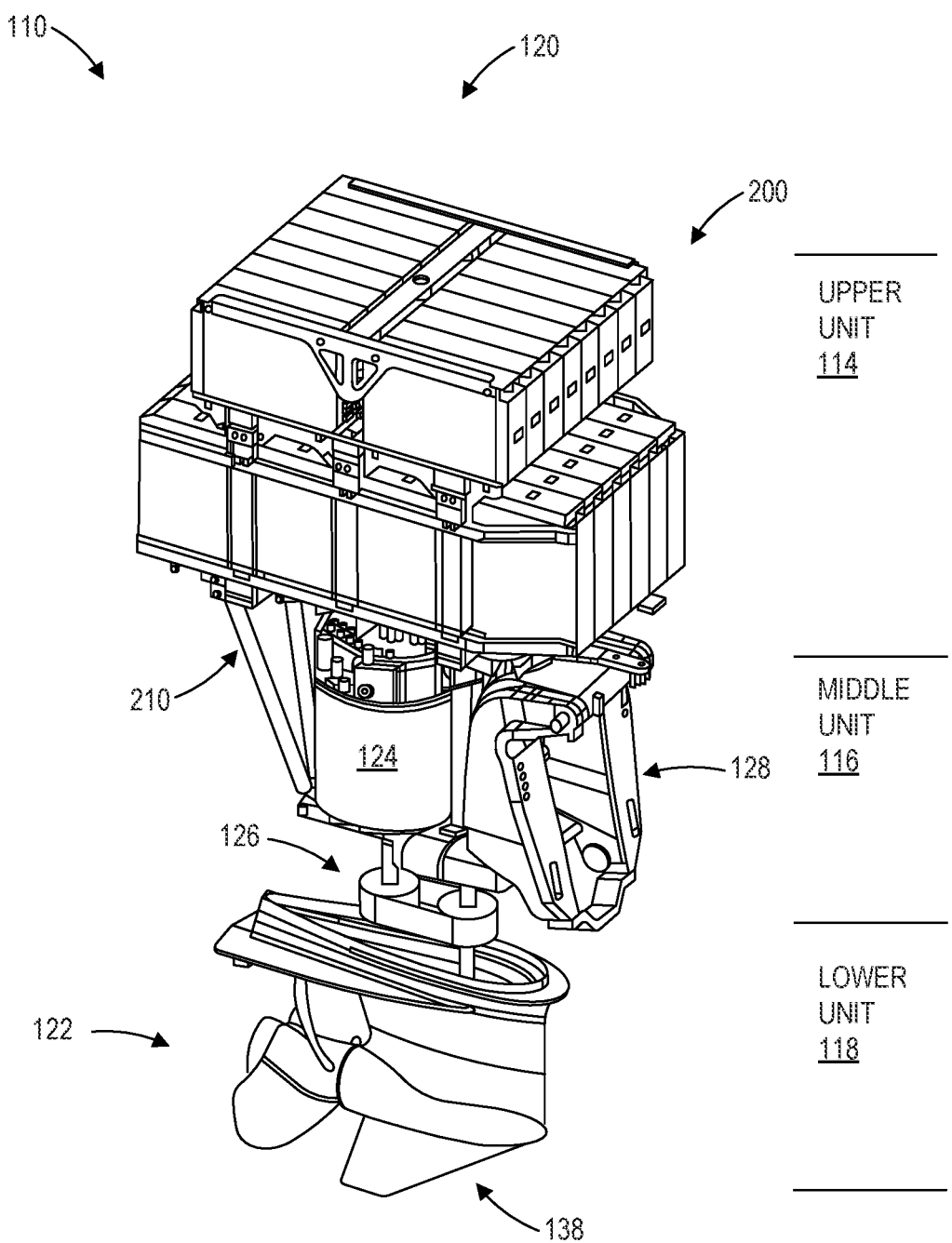
FIG. 5 is a top perspective view of an electric outboard motor assembly without a housing according to one example of the present disclosure.
Figure 6:
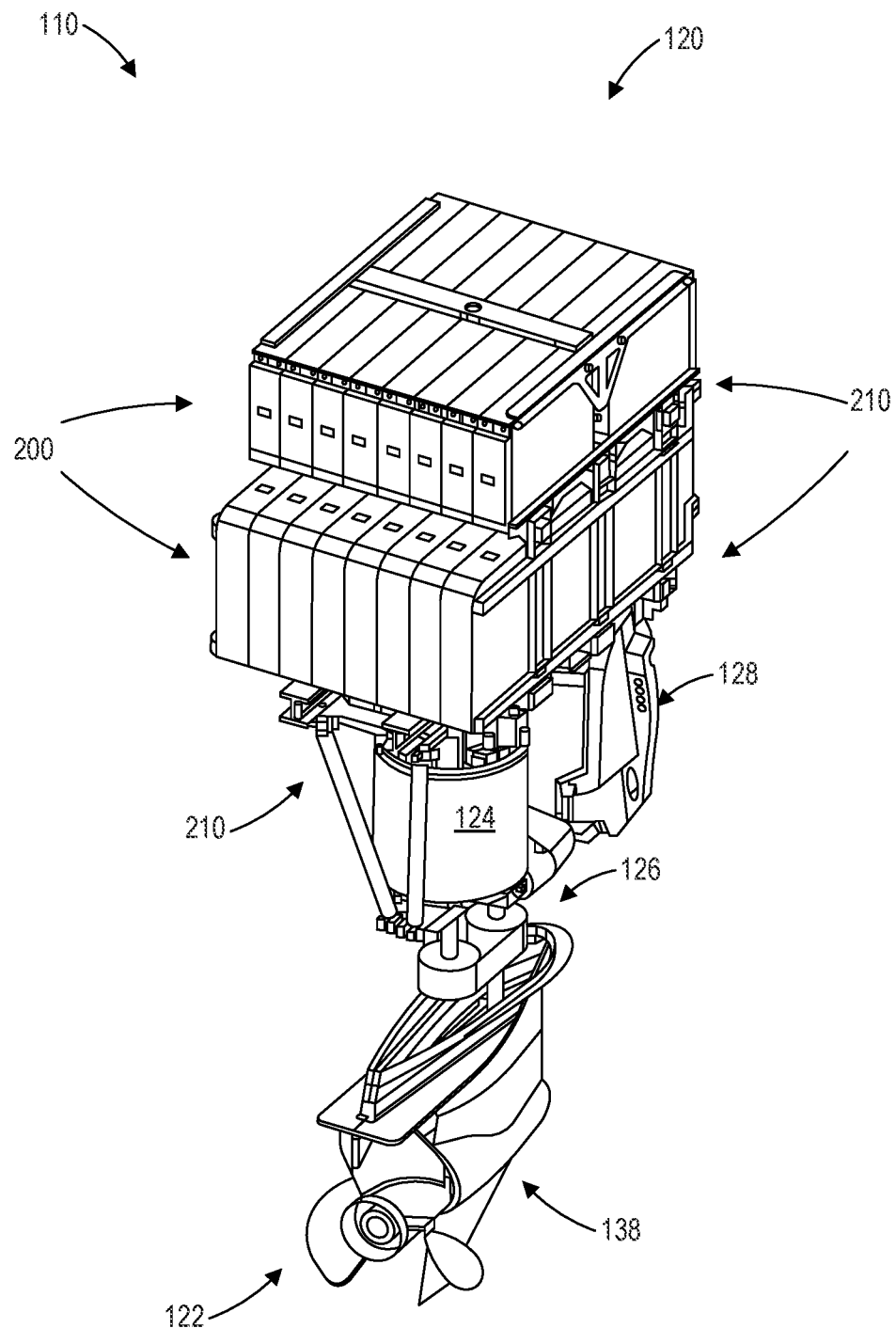
FIG. 6 is another top perspective view of the electric outboard motor assembly of FIG. 5.

FIG. 5 is a top side perspective view of the electric outboard motor assembly 110 according to one example of the present disclosure. FIG. 6 is another top side perspective view of the electric outboard motor assembly 110. In both FIG. 5 and FIG. 6, the electric outboard motor assembly 110 is illustrated with the outboard motor housing 150 removed.

The battery pack 120 is made up of one or more battery stacks 200 located within the upper unit 114. The motor assembly 124 and the transom mount 128 are located within the middle unit 116. The propeller assembly 122 and the gear assembly 126, along with fins 138 are illustrated in the lower unit 118.

In one example, the electric outboard motor assembly 110 includes a support structure 210. The support structure 210 is defined as a support frame system that provides support to one or more of the battery pack 120, motor assembly 124, transom mount 128, propeller assembly 122, gear assembly 126 and fins 138. The support structure 210 aids in retaining the elements that make up the electric outboard assembly 110 together as a single unit. In one example, the support structure 210 is made of a rigid, polymeric material. In other examples the support structure 210 is made of other materials, such as metal. Welds and/or fasteners, for example, may be used to assemble the support structure 210 and couple the support structure 210 to the battery pack 120, motor assembly 124, transom mount 128, propeller assembly 122, gear assembly 126 and/or fins 138.

Figure 7:
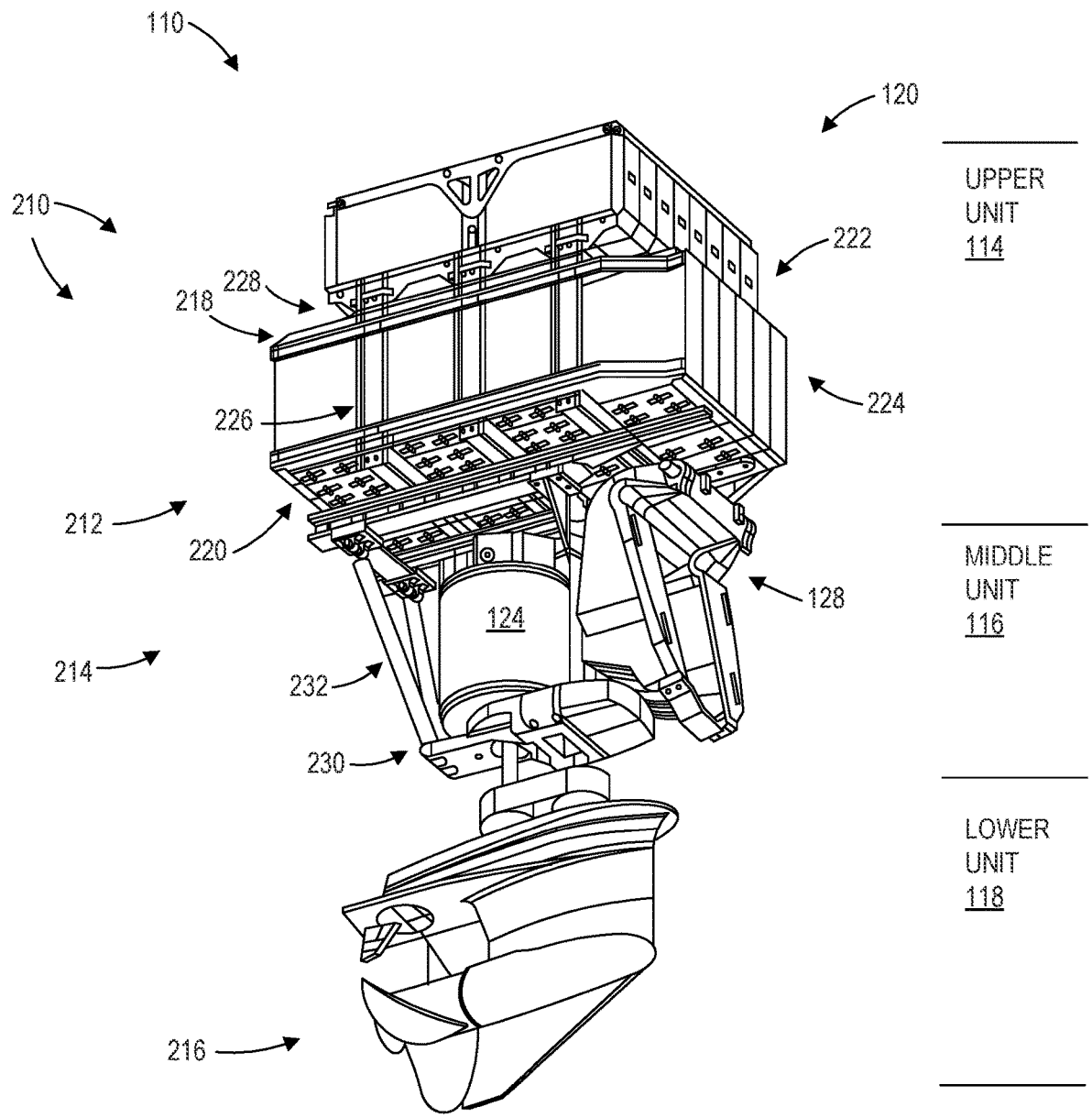
FIG. 7 is a bottom perspective view of the electric outboard motor assembly of FIG. 5.
Figure 8:
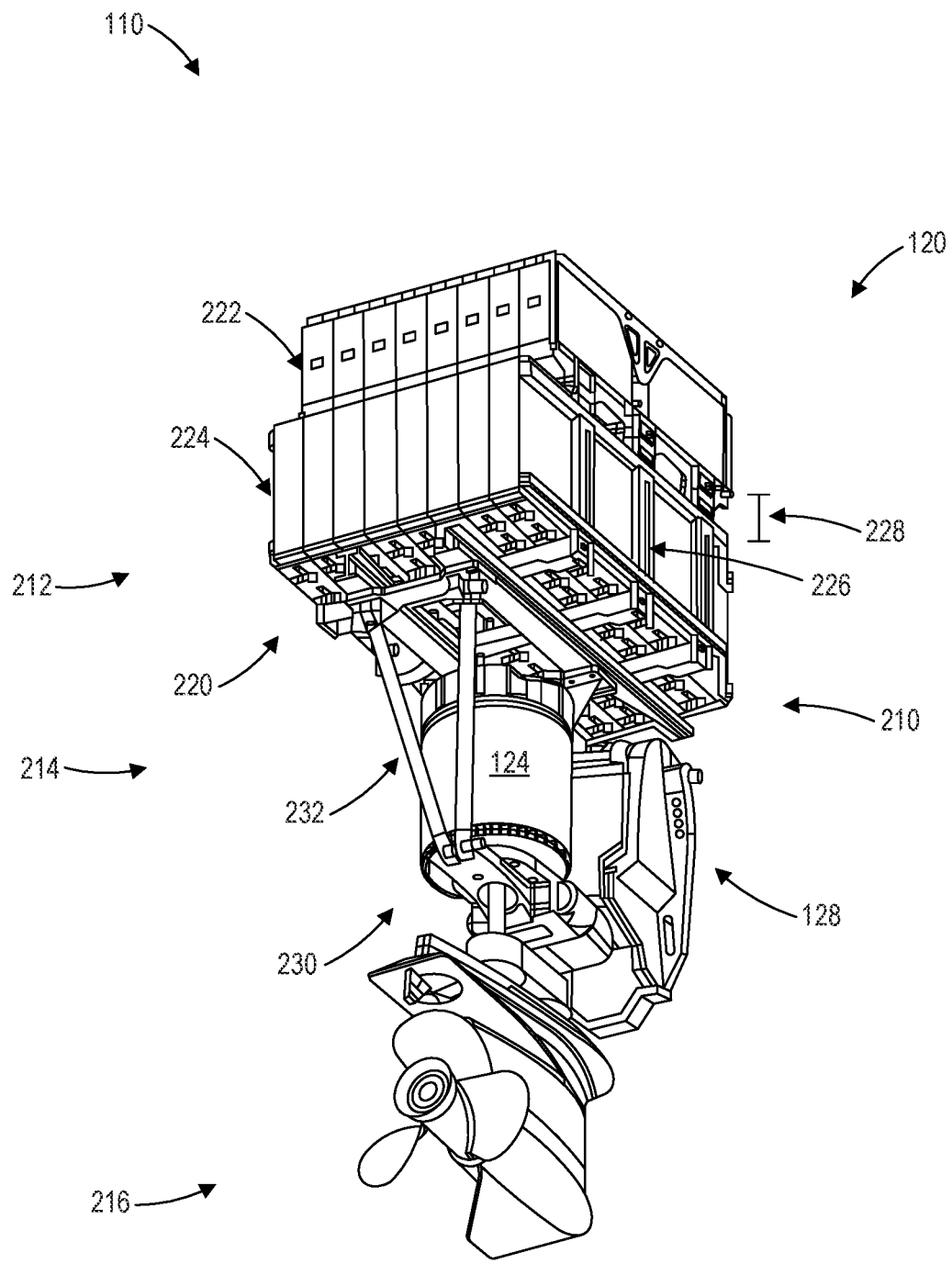
FIG. 8 is another bottom perspective view of the electric outboard motor assembly of FIG. 5.

Additional reference is made to FIG. 7 and FIG. 8. FIG. 7 is a bottom side perspective view of the electric outboard motor assembly 110 according to one example of the present disclosure. FIG. 8 is another bottom end perspective view of the electric outboard motor assembly 110 according to one example of the present disclosure. In these figures, additional elements illustrated in other views are not labeled for clarity.

Support structure 210 includes a battery rack 212, a motor rack 214, and propeller assembly support 216. The battery rack 212 is positioned within the upper unit 114 and includes a first platform 218 and second platform 220. The first platform 218 and the second platform 220 may be rigid frames or plates for supporting, and optionally coupling to, battery modules. In the non-limiting embodiment shown, the battery stack 120 includes a first stack of battery modules 222 and a second stack of battery modules 224. The first stack 222 is positioned over the second stack 224. The first stack 222 is positioned on the first platform 218, and the second stack 224 is positioned on the second platform 220. The first platform 218 is connected to the second platform 220 via vertical support members 226. The support members 226 may be rigid beams or bars connected to the first platform 218 and the second platform 220. Further, the support members 226 are sized such that when the first stack 222 is positioned on the first platform 218 and the second stack 224 is positioned on the second platform 220, the first stack 222 is spaced from the second stack 224, as indicated by space 228. The space 228 is formed between the first stack 222 and the second stack 224 along a longitudinal axis of the electric outboard motor assembly 110. Although two stacks of battery modules 222, 224 are shown, the battery pack may comprise a single battery stack, or multiple battery stacks, among other possibilities. As battery technology evolves, different arrangements, orientations and positioning of the battery modules can be envisaged.

Figure 9:
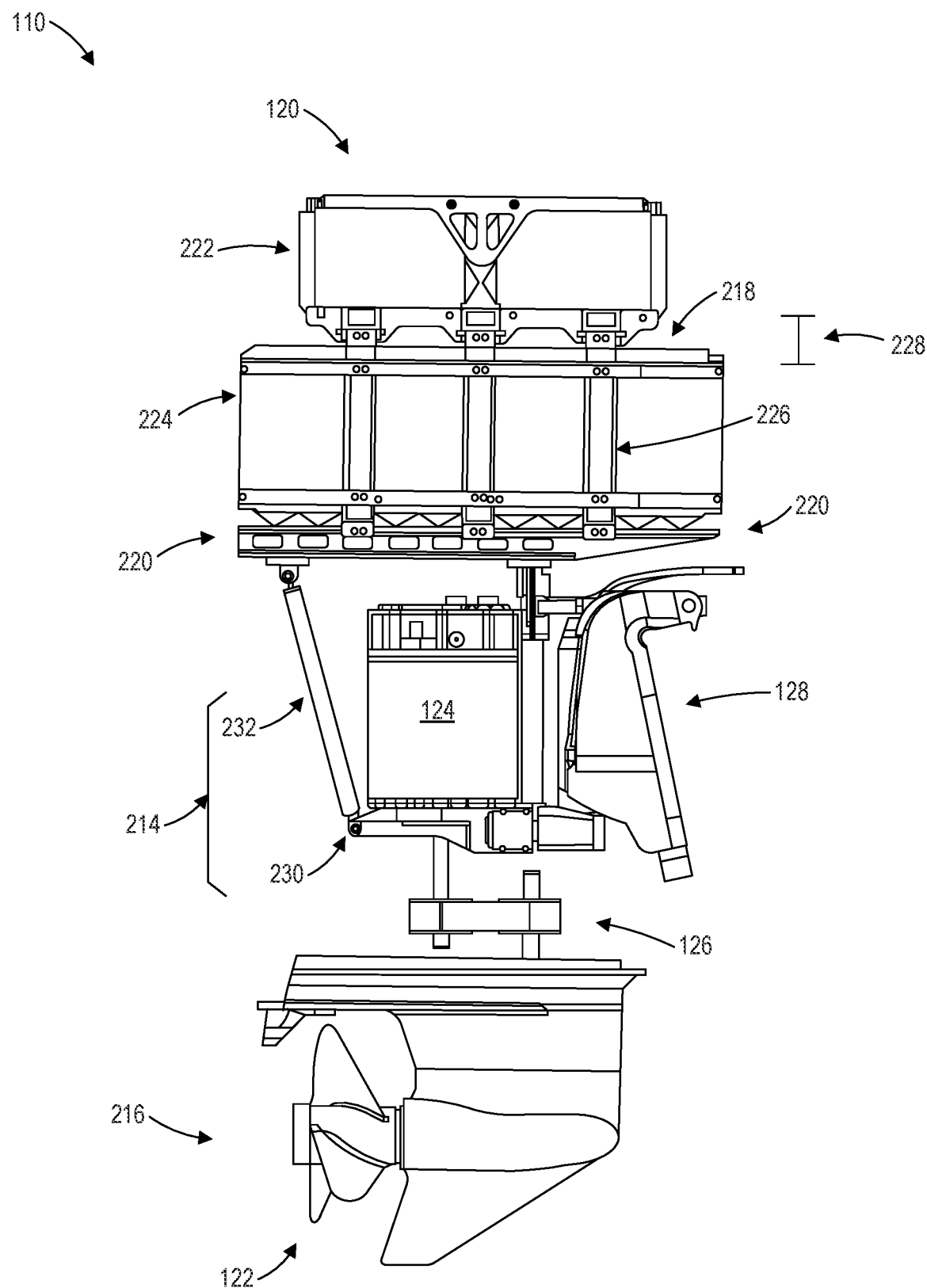
FIG. 9 is a side view of the electric outboard motor assembly of FIG. 5
Figure 10:
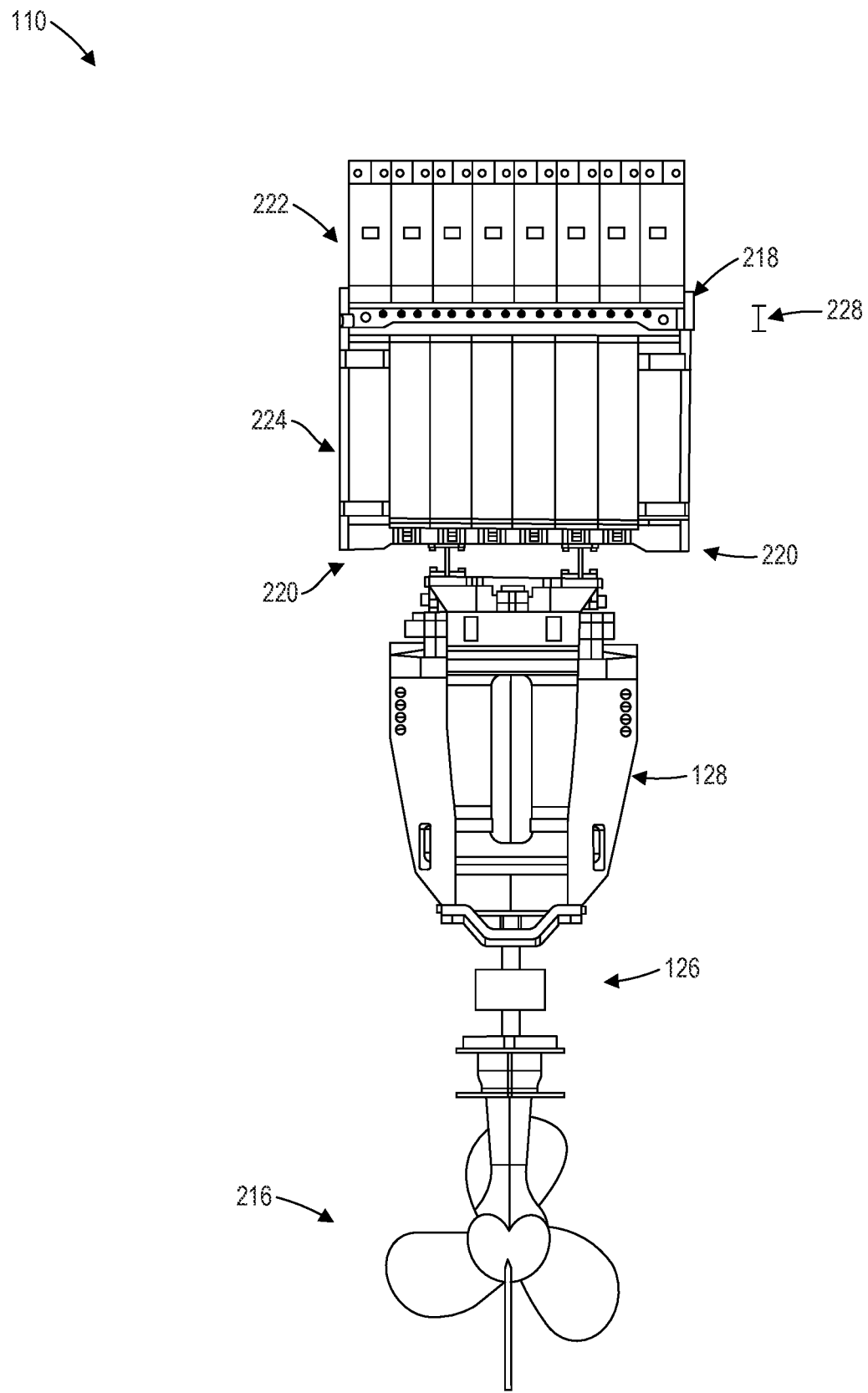
FIG. 10 is an end view of the electric outboard motor assembly of FIG. 5.

Additional reference is made to FIG. 9 and FIG. 10. FIG. 9 is a side view of the electric outboard motor assembly 110 according to one example of the present disclosure. FIG. 10 is an end view of the electric outboard motor assembly 110 according to one example of the present disclosure. The motor rack 214 includes a motor platform 230 and support members 232. The motor assembly 124 is positioned on the motor platform 230. The motor platform 230 may be a rigid frame or plate with connection points to couple to the motor assembly 124. The support members 232 extend between the motor platform 230 and the second platform 220 of the battery rack 212. The support members 232 may be rigid beams or bars that connect to the motor platform 230 and the second platform 220. The transom mount 128 is coupled to the motor rack 214. In one example, the transom mount 128 is coupled to and supported by the support members 232. The propeller assembly support 216 includes the propeller assembly 122 being coupled to the electric outboard motor assembly 110 via the gear assembly 126.

Figure 11:
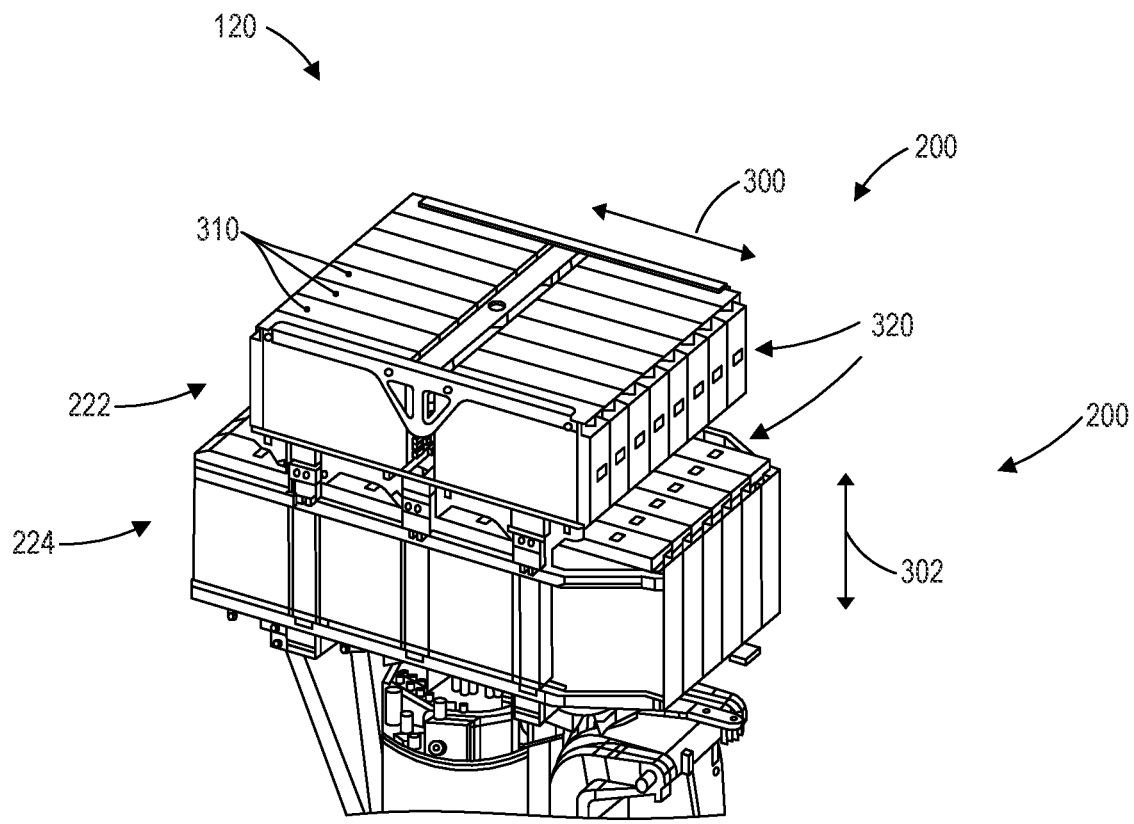
FIG. 11 is a perspective view of a battery pack for use in an electric outboard motor assembly according to one example of the present disclosure.

FIG. 11 is a perspective view of battery pack 120 for use in the electric outboard motor assembly 110 according to one example of the present disclosure. The battery pack 120 includes one or more battery stacks 200 made up of battery modules. The battery modules are electrically connected to form a high voltage circuit that drives the outboard motor assembly 110. In the illustrated example, the battery pack 120 includes the first stack of battery modules 222 and the second stack of battery modules 224. In other examples, the battery pack 120 may only include a single stack of battery modules or more than two stacks of battery modules. The first stack of battery modules 222 is positioned over the second stack of battery modules 224. The first stack of battery modules 222 is oriented in a first orientation 300 and the second stack of battery modules 224 is oriented in a second orientation 302 that is different from the first orientation 300. In this way, each battery module in the first stack of battery modules 222 may have a different orientation than the battery modules in the second stack of battery modules 224. In one example, the first orientation 300 is oriented at 90 degrees with respect to the second orientation 302. In other examples, the first stack of battery modules 222 may be oriented in the same direction as the second stack of battery modules 224.

In one example, the battery pack 120 is made up of multiple battery modules, where each battery module includes one or more battery cells. In one example, the battery modules are prismatic battery modules. The battery modules may comprise one or more cylindrical battery cells, one or more pouch battery cells and/or one or more prismatic battery cells. In one example, a battery module includes 12 pouch battery cells. The battery cells may be rechargeable. In one or more examples, the battery cells are rechargeable lithium-ion battery cells.

In one example, battery stacks 200 include multiple battery modules 310 connected together via cartridge assemblies 320. The number of battery modules 310 in the first stack of battery modules 222 may be the same as, less than, or more than the number of battery modules in the second stack of battery modules 224. In one example, the first stack of battery modules 222 includes 16 battery modules and the second stack of battery modules 224 includes 24 battery modules. In a non-limiting example, each battery module 310 comprises at least a first pouch battery cell, a second pouch battery cell and a cooling panel positioned between the first and second pouch battery cells. The cooling panel may include multiple layers of film or foil that define cooling channels to circulate a coolant between the pouch battery cells. One or more examples of a battery stack, a battery cartridge, a battery module and a battery cooling panel assembly suitable for use in the electric outboard motor assembly 110 are disclosed in U.S. patent application Ser. No. 17/091,777 titled Battery Cooling Panel for Electric Vehicles filed Nov. 6, 2020, the entire contents of which are incorporated herein by reference.

The use of pouch battery cells allows the construction of battery modules that have a relatively compact size for the amount of energy they are able to provide. In accordance with a non-limiting example, the battery modules 120 may provide an energy density in the range of 0.03-0.3 kWh/kg and a specific energy in the range of 100-300 kWh/m$^3$. At this energy density level, a battery pack 120 may have a relatively small volumetric size (allowing it to be housed in the upper unit 114 of an outboard motor housing 150) while providing sufficient energy to a motor capable of providing between 90-180HP, and in some cases between 130-180HP. In some examples, the battery pack 120 may be configured to output electric power at a voltage of between 300-400 volts, or up to 800 volts, for example.

It should be understood that as battery technology evolves, an even higher energy density range may be achievable for a battery pack having a volumetric size suitable for being positioned within an upper unit 114 of an outboard motor housing 150. As such, a configuration for an electric outboard motor assembly 110 having a battery pack 120 located in the upper unit 114, a propeller assembly 122 located in the lower unit 118 and a motor assembly 124 located in the middle unit 116 that is able to provide 350HP is included within the present application.

The battery pack 120 may be contained within a watertight enclosure. In one example, the housing 150 previously detailed herein provides the watertight enclosure. In another example, battery pack 120 is contained within a separate watertight enclosure (not illustrated), that is in turn positioned within the housing 150. In another example, each of the battery stacks 200 are contained within one or more waterproof enclosures. In one example, the first stack of battery modules 222 are contained in a watertight first battery enclosure and the second stack of battery modules 224 are contained in a watertight second battery enclosure separate from the first battery enclosure.

In one example, the electric outboard motor assembly 110 includes a battery management system (not shown) that may monitor battery modules contained in battery pack 120. A central battery management controller may communicate with battery module controllers on the battery modules to manage each of the battery modules. The central battery management controller may be responsible for making sure the battery is operating within its safe operating conditions, monitoring its state of charge (SoC) and state of health (SoH), and balancing the operation of the battery cells within each battery module. The battery management system may also monitor battery operating parameters such as battery module voltage and temperature. One battery management system suitable for use in electric outboard motor assembly 110 is disclosed in U.S. Patent Application No. 63/135,452, titled Electric Vehicle Having A Modular Distributed Battery Management System, the entire contents of which are incorporated herein by reference.

In one example, the electric outboard motor assembly 110 may include a high-voltage module that selectively connects or disconnects the battery pack 120 to other components of the outboard motor assembly 110. The selective connection and disconnection of the battery pack 120 may be done according to instructions or algorithms executed by a control system.

In one example, the electric outboard motor assembly 110 may include one or more heating modes (including battery heating circuits) for the battery stacks 200 and individual battery modules. The battery heating modes may allow the electric outboard motor assembly 110 to warm the battery pack 120 and run in cold conditions. One thermal management system that includes battery heating modes suitable for use in electric outboard motor assembly 110 is disclosed in U.S. patent application Ser. No. 17/091,625 titled Thermal Management System for Electric Vehicle filed Nov. 6, 2020, the entire contents of which are incorporated herein by reference.

Figure 12:
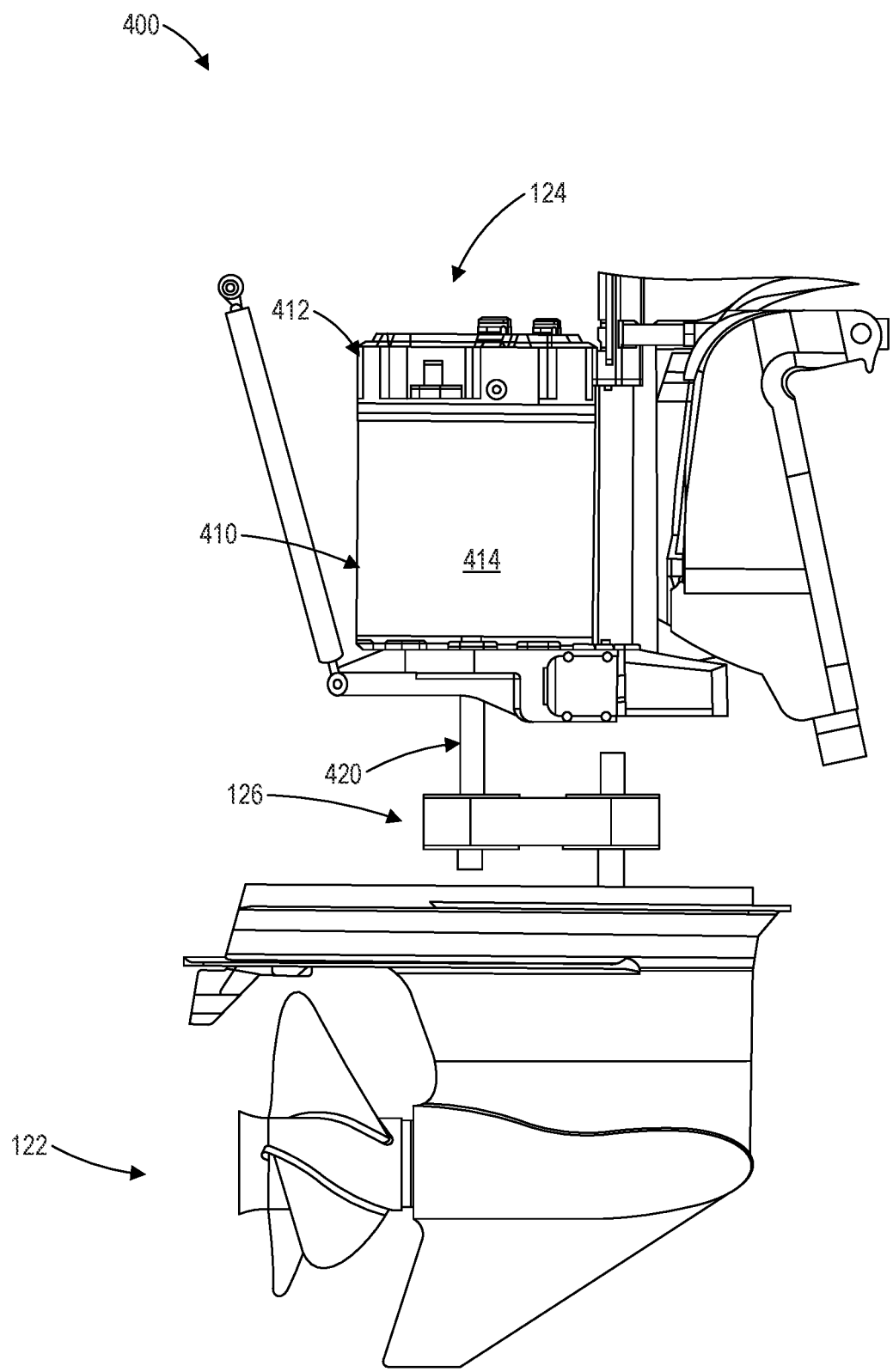
FIG. 12 is a side view of a motor assembly for use in an electric outboard motor assembly according to one example of the present disclosure.
Figure 13:
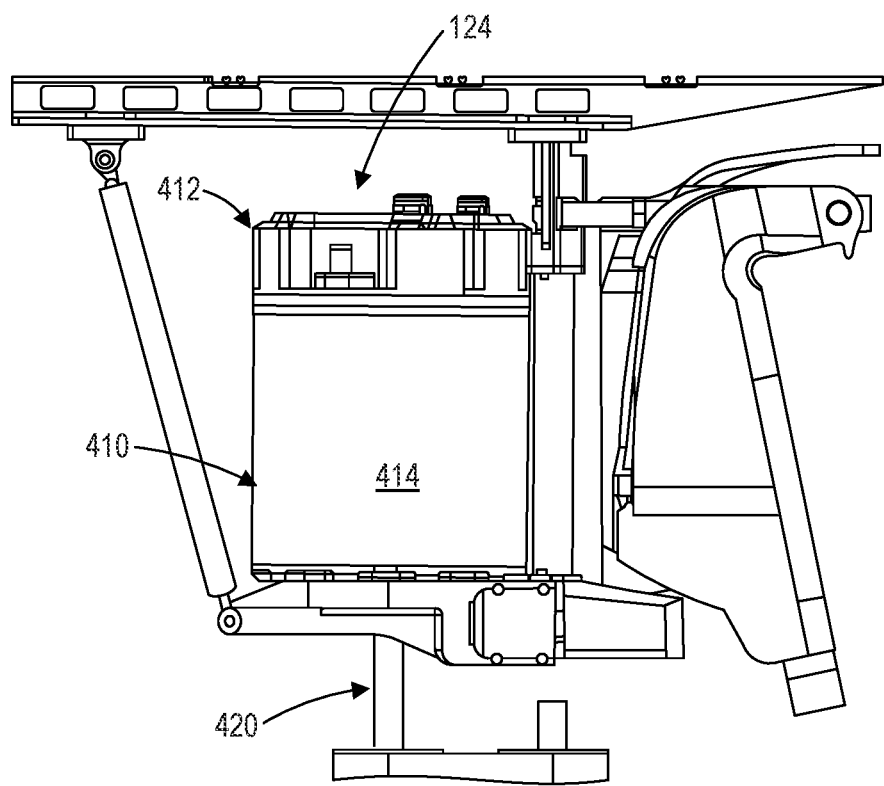
FIG. 13 is a partial view of a motor assembly for use in an electric outboard motor assembly according to one example of the present disclosure.

FIG. 12 illustrates generally at 400 a view of the motor assembly 124 positioned in the electric outboard motor assembly 110 according to one example of the present disclosure. FIG. 13 is a partial close-up view of the motor assembly 124 illustrated in FIG. 12. In one example, the motor assembly 124 includes an alternating current (AC) motor 410 coupled to an inverter 412. The motor assembly 124 is an integrated motor assembly where the inverter 412 is integrated into a common housing 414 with the motor 110. In this example, a footprint of the housing 414 is generally cylindrically shaped. The motor 410 includes a motor drive shaft 420. The motor 410 is mechanically coupled to the gear assembly 126 for driving the propeller assembly 122. The motor 410 may be a permanent magnet synchronous motor. In an alternative embodiment, any electric motor suitable for providing sufficient HP and having dimensions suitable for being housed within the middle unit 116 of the electric outboard motor assembly 110 may be used. In some examples, the motor assembly 124 includes a brushless direct current (DC) motor.

One motor assembly including a motor coupled to an inverter, suitable for use in the present electric outboard motor assembly, is disclosed in U.S. Patent Application No. 63/135,466, titled DRIVE UNIT FOR ELECTRIC VEHICLE, filed Jan. 8, 2021, the entire contents of which are incorporated herein by reference.

Figure 14:
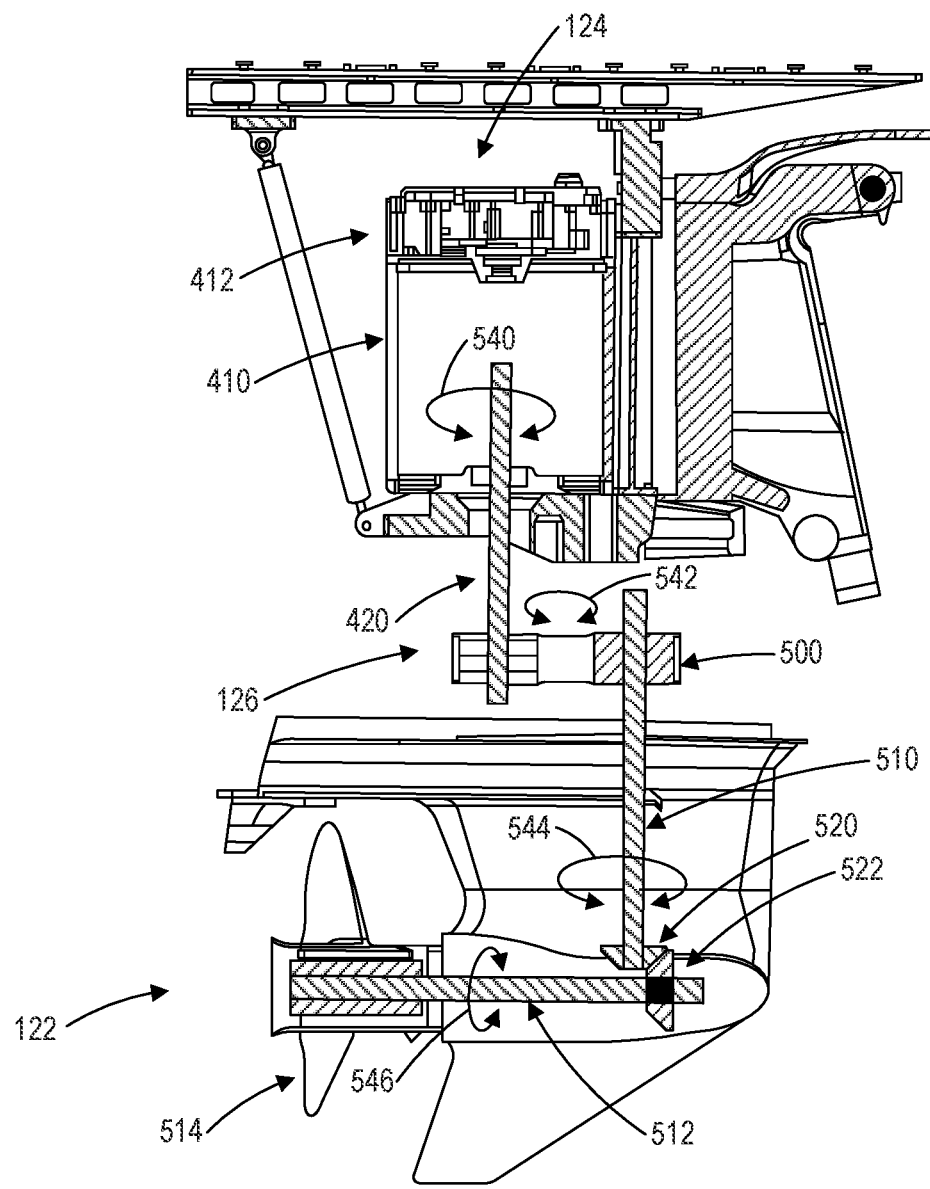
FIG. 14 is a partial mechanical diagram of an electric outboard motor assembly according to one example of the present disclosure.

FIG. 14 is a partial mechanical diagram of the electric outboard motor assembly 110 further illustrating a mechanical operation of the motor assembly 124 for driving the propeller assembly 122. The motor drive shaft 420 extends vertically down from motor 410, and is mechanically coupled to the gear assembly 126. The gear assembly 126 may be a belt driven gear assembly, indicated at 500. A gear shaft 510 extends from the belt driven gear assembly 500 downward to the propeller assembly 122. The propeller assembly 122 includes a propeller drive shaft 512 coupled to a propeller 514. The gear shaft 510 includes a bevel gear 520 at one end that interacts with a bevel gear 522 coupled to the propeller drive shaft 512. In operation, the motor 410 is operated to rotate the motor drive shaft 420, indicated at 540. The belt gear 500 is activated by the motor drive shaft 420 (indicated at 542), which in turn operates the gear shaft 510 (indicated at 544). The gear drive 510 drives the propeller drive 512 (indicated at 546) via gear interaction between the bevel gears 520, 522. The propeller drive shaft 512 is direct coupled to propeller 514.

In this example, the motor assembly 124 is mounted vertically within the middle unit 116. The motor drive shaft 420 is substantially perpendicular to the propeller drive shaft 512. However, other configurations are also contemplated. For example, the motor drive shaft 420 may be parallel to the propeller drive shaft 512 and may directly drive the propeller drive shaft 512 in some cases. The motor assembly 124 can be operated in a first or a second direction, operating the propeller 514 in forward or reverse.

Figure 15:
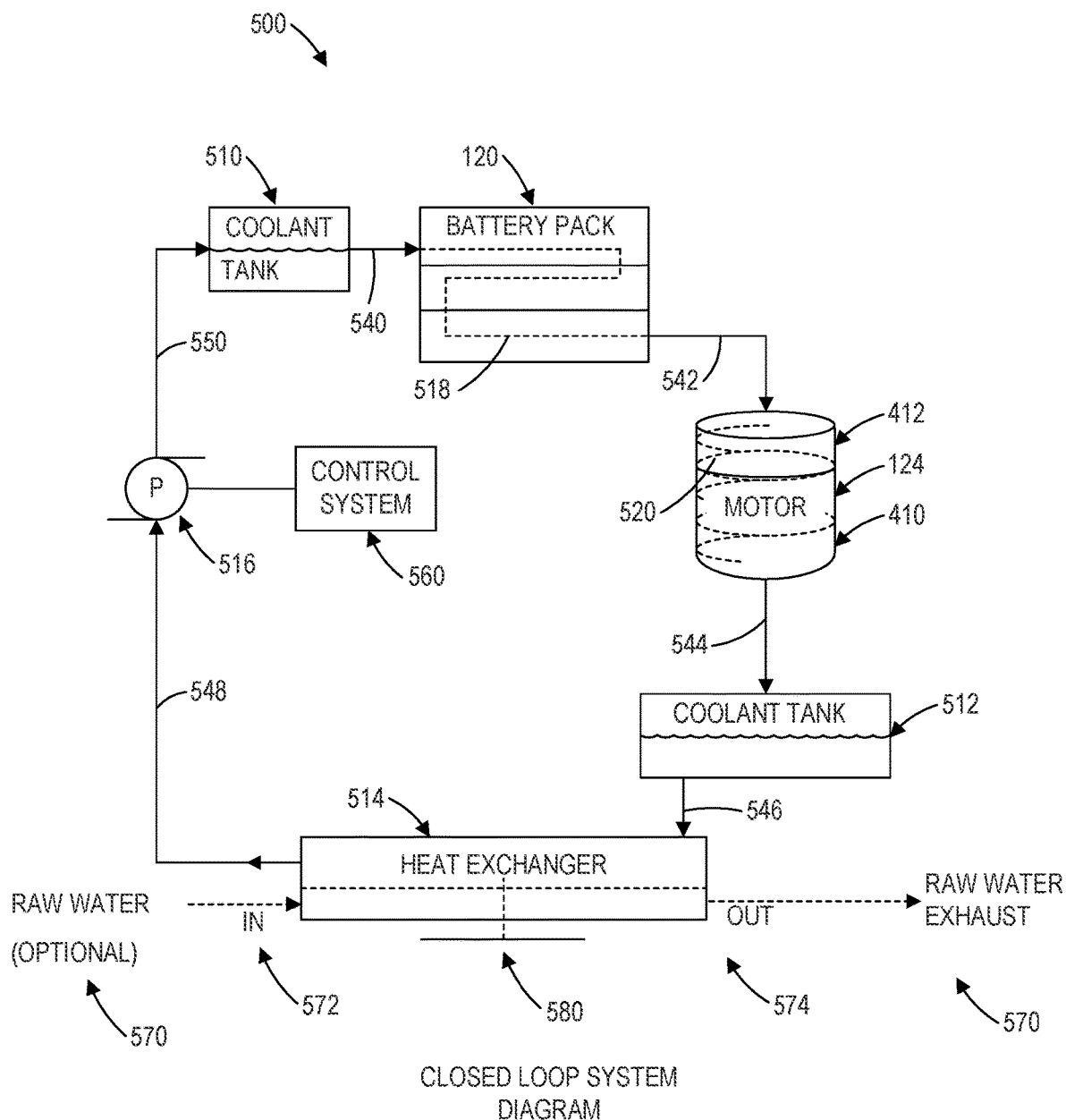
FIG. 15 is a block diagram of a thermal management system including a closed-loop system for use with an electric outboard motor assembly according to one example of the present disclosure.

FIG. 15 is a block diagram of a thermal management system 500 for use with the electric outboard motor assembly 110 according to one example of the present disclosure. The thermal management system 500 operates to provide cooling during operation of the electric outboard motor assembly 110. The thermal management system 500 may be located integral to the electric outboard motor assembly 110, and provides cooling of the battery pack 120 and/or motor assembly 124. More specifically, the thermal management system 500 may be housed at least partially within the housing 150 of the electric outboard motor assembly 110. In one example, the thermal management system 500 is a closed-loop liquid cooling system. In one or more examples, the thermal management system 500 may additionally or alternatively include the use of an open-loop system and/or a hybrid cooling system that uses both a closed-loop and an open-loop system. The thermal management system 500 may also comprise a cooling plate for providing additional cooling to the electric outboard motor assembly 110.

In a non-limiting example, thermal management system 500 is a closed-loop liquid cooling system that includes one or more coolant tanks 510, 512, a heat exchanger 514, and a pump 516. The battery pack 120 and the motor assembly 124 include coolant paths 518 and 520 routed therethrough. For example, the coolant paths 518 may include channels within cooling panels of battery modules in the battery pack 120. The coolant paths 520 may include channels formed within one or more walls of the housing 410 for the motor assembly 124. As illustrated, the coolant reservoir or tank 510 is in fluid communication 540 with the battery pack 120; the battery pack 120 is in fluid communication 542 with the motor assembly 124, including the motor 410 and inverter 412; the motor assembly 124 is in fluid communication 544 with the coolant tank 512; the coolant tank 512 is in fluid communication 546 with the heat exchanger 514; the heat exchanger 514 is in fluid communication 548 with the pump 516; and the pump 516 is in fluid communication 550 with the coolant tank 510. However, this is only one example arrangement of a thermal management system. The various components of the electric outboard motor assembly 110 could be fluidly interconnected by a thermal management system in other ways. Further, more or fewer coolant tanks could be implemented in a thermal management system.

The thermal management system 500 is operated through activation of the pump 516 by a control system 560. The pump 516 operates to move liquid coolant through the system 500, including through conduits implemented at 540, 542, 544, 546, 548, 550. Coolant is pumped from the coolant tank 510 through the battery pack 120 and the motor assembly 124 to remove heat that occurs during operation of the outboard motor assembly 110. As a result, the temperature of coolant leaving the battery pack 120 (indicated at 542) is higher than the temperature of entering the battery pack 120 (indicated at 540). The temperature of coolant leaving the motor assembly 124 (indicated at 544) is higher than the temperature of the coolant entering the motor assembly 124 (indicated at 542). Coolant may be temporarily stored in the coolant tank 512, prior to entering the heat exchanger 514. The heat exchanger 514 operates to remove heat from the liquid coolant entering the heat exchanger 514 (indicated at 546) such that it exits the heat exchanger 514 at a cooler temperature (indicated at 548).

Additional cooling of liquid coolant located with the closed-loop system 500 can be accomplished using a secondary cooling system. In one example, the secondary cooling system is a raw water (i.e., water to water) cooling system indicated at 570. Raw water is brought into the heat exchanger 514 at a raw water inlet 572, used to remove heat from the liquid coolant passing through the heat exchanger 514, and exits at an outlet 574 at a higher temperature. In another example, the secondary cooling system includes a cooling plate 580 to aid in cooling liquid coolant in the closed-loop system, including liquid coolant passing through the heat exchanger 514.

Figure 16:
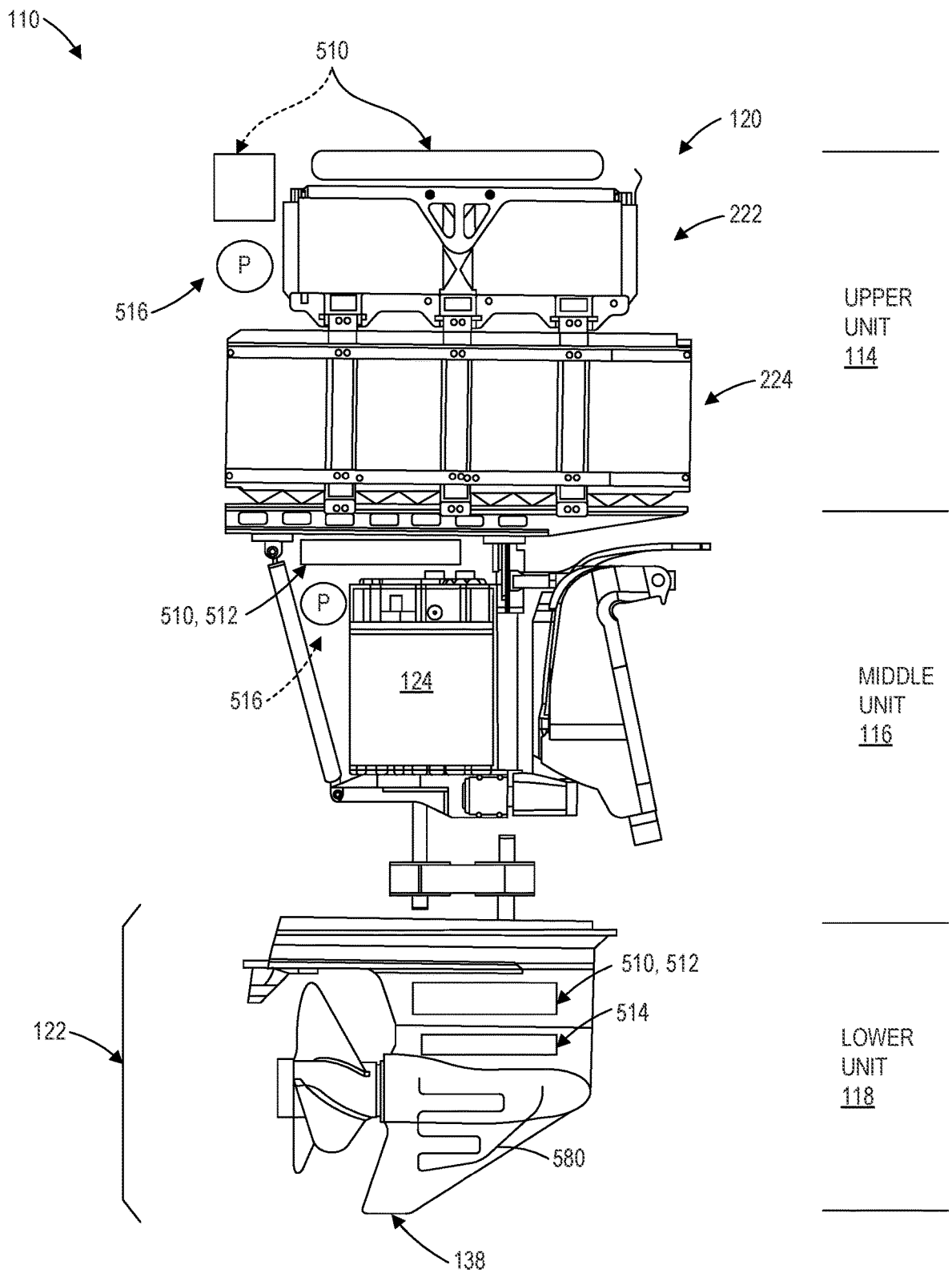
FIG. 16 is a side view illustrating an electric outboard motor assembly including a thermal management system according to one example of the present disclosure.

FIG. 16 is a side view of the electrical outboard motor assembly 110 illustrating one or more examples of physical locations of elements of the thermal management system 500. In one example, the coolant tank 510 is located above and/or adjacent to the battery pack 120 within the upper unit 114. For example, the coolant tank 510 may be located immediately adjacent to the battery pack 120. The coolant pump 516 may be located immediately adjacent or on one side of the battery pack 120. For example, the pump 516 may be located to one side of the first stack 222 and above the second stack 224. In one example, the coolant tank 510 or the coolant tank 512 may be located in the middle unit 116, above or adjacent the motor assembly 124. The coolant pump 516 may also be located within the middle unit 116 adjacent the motor assembly 124. In one example, the heat exchanger 514 may be located in the lower unit 118 near the propeller assembly 122, although it may also be located within the middle unit 116. The coolant tank 510 or 512 can also be located within the lower unit 118. In other examples, the coolant path may be routed through cooling channels 580 integrally formed within the lower unit 118 including within the fin 138.

The electric outboard motor assembly 110 disclosed herein provides an integrated electric outboard motor assembly that has a battery pack and motor assembly housed in the same housing. This results in a more conveniently packaged electric outboard motor assembly that can be used on boats and watercraft of differing sizes. The high energy density battery modules that can be packaged in a relatively small volumetric space enable the electric outboard motor assembly to power much larger boats than has traditionally been possible with integrated electric outboard motor assemblies. The integrated electric outboard motor assembly can further provide an integrated thermal management system that is a closed loop liquid cooling system for cooling the battery pack and motor assembly during operation of the electric outboard motor assembly. The electric outboard motor assembly can be used with a variety of sized boats having hulls with many different shapes and sizes.

Although specific examples have been illustrated and described herein, a variety of alternate and/or equivalent implementations may be substituted for the specific examples shown and described without departing from the scope of the present disclosure. This disclosure is intended to cover any adaptations or variations of the specific examples discussed herein.

Various example embodiments will now be provided.

Example embodiment 1: An electric outboard motor assembly comprising: a battery pack located in an upper unit; a propeller assembly located in a lower unit; and a motor assembly located in a middle unit between the upper unit and the lower unit.

Example embodiment 2: The assembly of example embodiment 1, comprising an outboard motor housing, where the outboard motor housing comprises a first portion that houses the battery pack and a second portion that houses the motor assembly.

Example embodiment 3: The assembly of example embodiment 2, wherein the first portion of the housing defines a first interior volume and the second portion of the housing defines a second interior volume, the first interior volume being greater than the second interior volume.

Example embodiment 4: The assembly of example embodiment 2, where the outboard motor assembly defines a longitudinal axis extending from the upper unit to the lower unit, wherein a first circumferential measurement of the first portion of the housing at a mid-point of the upper unit along the longitudinal axis is greater than a second circumferential measurement of the second portion of the housing at a mid-point of the middle unit along the longitudinal axis.

Example embodiment 5: The assembly of example embodiment 2, wherein the outboard motor housing comprises an inboard end operative for facing inboard of the watercraft and an outboard end operative for facing outboard of the watercraft, the inboard end of the second portion of the housing being indented in relation to the inboard end of the first portion of the housing.

Example embodiment 6: The assembly of example embodiment 2, wherein a transom mount is attachable to one of the second portion of the housing and an internal support structure of the outboard motor at a location beneath the upper unit.

Example embodiment 7: The assembly of example embodiment 2, where at least a portion of the first portion of the housing and the second portion of the housing are integrally formed together.

Example embodiment 8: The assembly of example embodiment 2, where at least part of the first portion of the housing enables access to the battery pack.

Example embodiment 9: The assembly of example embodiment 2, where at least part of the second portion of the housing enables access to the motor assembly.

Example embodiment 10: The assembly of example embodiment 2, where a seam separates the first portion of the housing from the second portion of the housing.

Example embodiment 11: The assembly of example embodiment 1, where the battery pack comprises a plurality of prismatic battery modules.

Example embodiment 12: The assembly of example embodiment 1, where the battery pack comprises a plurality of pouch battery cells.

Example embodiment 13: The assembly of example embodiment 1, where each battery module includes at least one battery cell.

Example embodiment 14: The assembly of example embodiment 1, where the battery pack comprises a first stack of battery modules and a second stack of battery modules, where the first stack is positioned over the second stack.

Example embodiment 15: The assembly of example embodiment 13, where the first stack of battery modules are oriented in a first orientation and the second stack of battery modules are oriented in a second orientation different than the first orientation.

Example embodiment 16: The assembly of example embodiment 14, where the first orientation is at 90 degrees with respect to the second orientation.

Example embodiment 17: The assembly of example embodiment 1, where the motor assembly is an integrated motor assembly with an inverter and an ac motor contained within a common motor assembly housing.

Example embodiment 18: The assembly of example embodiment 1, the propeller assembly including a propeller drive shaft, and where a motor drive shaft of the motor assembly is perpendicular to the propeller drive shaft.

Example embodiment 19: The assembly of example embodiment 1, comprising a gear assembly coupled between the motor assembly and the propeller assembly.

Example embodiment 20: The assembly of example embodiment 1, comprising a thermal management system in communication with the battery pack and the outboard motor assembly.

Example embodiment 21: The assembly of example embodiment 20, wherein the thermal management system comprises a closed loop liquid cooling system.

Example embodiment 22: The assembly of example embodiment 1, where the assembly has a center of gravity located between the battery pack and the motor assembly.

Example embodiment 23: An electric outboard motor assembly comprising: an outboard motor housing a battery pack including a plurality of prismatic pouch battery modules, the battery pack located within the outboard motor housing; and a motor assembly located within the outboard motor housing.

Example embodiment 24: The assembly of example embodiment 23, the outboard motor housing comprising a first housing portion and a second housing portion, where the battery pack is positioned within the first housing portion.

Example embodiment 25: The assembly of example embodiment 23, where the battery pack comprises a first stack of battery modules and a second stack of battery modules, where the first stack is positioned over the second stack.

Example embodiment 26: The assembly of example embodiment 25, where the first stack of battery modules are oriented in a first position and the second stack of battery modules are oriented in a second position different than the first position.

Example embodiment 27: An electric outboard motor assembly comprising: an outboard motor housing; a battery pack; a motor assembly comprising an inverter and outboard motor; and a thermal management system in fluid communication with the battery pack and the motor assembly, where at least two of the battery pack, the motor assembly and the thermal management system are located within the outboard motor housing.

Example embodiment 28: The assembly of example embodiment 27, where the battery pack, motor assembly and thermal management system are all at least partially located within the outboard motor housing.

Example embodiment 29: The assembly of example embodiment 27, where the thermal management system comprises a closed loop liquid system.

Example embodiment 30: The assembly of example embodiment 19, the thermal management system comprising a coolant pump and a reservoir tank, in fluid communication with the battery pack and the motor assembly.

Example embodiment 31: The assembly of example embodiment 22, where the reservoir tank is located adjacent the battery pack.

Example embodiment 32: The assembly of example embodiment 22, the thermal management system further comprising a heat exchanger.

Example embodiment 33: The assembly of example embodiment 24, where the heat exchanger further includes a raw water inlet and outlet to aid in removing rejected heat from coolant moving therethrough.

The invention claimed is:

1. An electric outboard motor assembly comprising:
   a battery pack located in an upper unit;
   a propeller assembly located in a lower unit; and
   a motor assembly located in a middle unit between the upper unit and the lower unit, wherein the battery pack and motor assembly are housed within an outboard motor housing, and wherein the motor assembly is an integrated motor assembly with an inverter and an alternating current (AC) motor contained within a common motor assembly housing which is distinct from the outboard motor housing.

2. The electric outboard motor assembly of claim 1, comprising an outboard motor housing, where the outboard motor housing comprises a first portion that houses the battery pack and a second portion that houses the motor assembly.

3. The electric outboard motor assembly of claim 2, wherein the first portion of the housing defines a first interior volume and the second portion of the housing defines a second interior volume, the first interior volume being greater than the second interior volume.

4. The electric outboard motor assembly of claim 2, wherein a transom mount is attachable to one of the second portion of the housing and an internal support structure of the outboard motor at a location beneath the upper unit.

5. The electric outboard motor assembly of claim 2, wherein the first portion of the housing and the second portion of the housing are at least partially integrally formed together.

6. The electric outboard motor assembly of claim 2, wherein the first portion of the housing and the second portion of the housing are joined together at a seam.

7. The electric outboard motor assembly of claim 2, wherein at least part of the first portion of the housing enables access to the battery pack.

8. The electric outboard motor assembly of claim 2, wherein at least part of the second portion of the housing enables access to the motor assembly.

9. The electric outboard motor assembly of claim 1, wherein the battery pack comprises a plurality of battery modules.

10. The electric outboard motor assembly of claim 9, wherein each of the plurality of battery modules comprises a plurality of battery cells.

11. The electric outboard motor assembly of claim 10, wherein the plurality of battery cells comprises a plurality of pouch cells.

12. The electric outboard motor assembly of claim 9, wherein the plurality of battery modules comprises a first stack of prismatic battery modules and a second stack of prismatic battery modules, wherein the first stack is positioned above the second stack.

13. The electric outboard motor assembly of claim 1, the propeller assembly including a propeller drive shaft, and where a motor drive shaft of the motor assembly is perpendicular to the propeller drive shaft.

14. The electric outboard motor assembly of claim 1, comprising a gear assembly coupled between the motor assembly and the propeller assembly.

15. The electric outboard motor assembly of claim 1, comprising a thermal management system in fluid communication with the battery pack and the motor assembly.

16. The electric outboard motor assembly of claim 15, wherein the thermal management system comprises a closed-loop liquid cooling system.

17. The electric outboard motor assembly of claim 1, wherein the assembly has a center of gravity located between the battery pack and the motor assembly.

18. An electric outboard motor assembly comprising:
    an outboard motor housing;
    a battery pack, located within the outboard motor housing, comprising a plurality of battery modules, each of the battery modules comprising a plurality of battery cells; and
    a motor assembly located within the outboard motor housing.

19. The electric outboard motor assembly of claim 18, wherein the plurality of battery cells comprises a plurality of pouch cells.

20. An electric outboard motor assembly comprising:
- an outboard motor housing;
- a battery pack;
- a motor assembly comprising an inverter and a motor; and
- a thermal management system in fluid communication with the battery pack and the motor assembly,
- wherein at least two of the battery pack, the motor assembly and the thermal management system are located within the outboard motor housing.

21. The electric outboard motor assembly of claim 20, wherein the battery pack, the motor assembly and the thermal management system are all at least partially located within the outboard motor housing.

22. The electric outboard motor assembly of claim 20, wherein the thermal management system comprises a closed-loop liquid system.

23. The electric outboard motor assembly of claim 20, the thermal management system comprising a coolant pump and a reservoir tank, in fluid communication with the battery pack and the motor assembly.

24. The electric outboard motor assembly of claim 20, the thermal management system further comprising a heat exchanger.

* * * * *